United States Patent [19]

Becher et al.

[11] 4,427,879

[45] Jan. 24, 1984

[54] OPTOELECTRONIC CONNECTOR ASSEMBLY

[75] Inventors: James V. Becher, Naperville; Tedford H. Spaulding, Norridge, both of Ill.

[73] Assignee: Allied Corporation, Morris Township, Morris County, N.J.

[21] Appl. No.: 783,754

[22] Filed: Apr. 1, 1977

Related U.S. Application Data

[62] Division of Ser. No. 569,578, Apr. 18, 1975.

[51] Int. Cl.³ .......................................... H01J 39/12
[52] U.S. Cl. ............................ 250/215; 250/227; 250/551; 350/96.15; 350/96.18; 350/96.20
[58] Field of Search ............ 350/96.15, 96.18, 96.20; 250/215, 227, 551

[56] References Cited

U.S. PATENT DOCUMENTS

| | | | |
|---|---|---|---|
| 3,790,791 | 2/1974 | Anderson | 250/551 |
| 3,809,908 | 5/1974 | Clanton | 350/96.20 |
| 3,878,397 | 4/1975 | Robb et al. | 350/96.20 |
| 3,982,060 | 9/1976 | Avery et al. | 350/96.20 |
| 4,075,477 | 2/1978 | Hanson | 350/96.20 |
| 4,076,376 | 2/1978 | Slaughter | 350/96.20 |

*Primary Examiner*—Saxfield Chatmon, Jr.

[57] ABSTRACT

An optoelectronic connector assembly having electrical and optical connector parts include housings which can be resiliently engaged and manually disengaged from each other. The electrical connector part housing has a socket receiving cavity therethrough for receiving an optoelectronic transducer. The transducer can be a light emitting element such as a light emitting diode, or can be a light responsive element such as a photodiode. The two housings are engaged by means of a protuberance having an inclined ramp on one of the housings, the other housing having an interlock recess therein so that, when the two housings mate, the inclined ramp operates upon the interlock recess so as to provide for a resilient but positive and firm engagement of the two housings. The optical connector part housing has a pin contact receiving cavity for receiving a fiber optic light guide. A pin connector means holds the fiber optic light guide within the pin receiving cavity so that the light guide cooperates with the optoelectronic element in the socket receiving cavity of the electrical connector part housing. The pin contact means includes a first crimpable section which is engageable about an outer jacket of the fiber optic light guide while a second crimpable section engages about an inner light conductive fiber of the light guide. The pin contact means engages the interior portions of the pin contact receiving cavity so as to be firmly engaged therein. A terminal end of the fiber optic light guide can have a curved shape: convex, mushroom, or meniscus shape such as that determined by a surface tension effect of the fiber optic material by application of heat applied to its terminal end.

24 Claims, 17 Drawing Figures

OPTOELECTRONIC CONNECTOR ASSEMBLY

This is a continuation of application Ser. No. 569,578, filed Apr. 18, 1975.

BACKGROUND OF THE INVENTION

1. Field of the Invention

This invention relates to optoelectronic connector assembly systems and, in particular, to electrical connector parts for housing optoelectronic transducers and to optical connector parts for housing terminal portions of a fiber optic light guide. The invention also relates to a fiber optic light guide having an integral lens associated therewith. Accordingly, the general objects of this invention are to provide new and improved systems, parts, and combined guide-lens of such character.

2. Description of the Prior Art

For certain applications, it is desirable to transmit signals between two stations of a system over a closed, nonconductive, nonelectrical transmission path. Such a path can employ a flexible fiber optic light guide. Electrical signals are converted to light signals at one end of the system, and the light signals are transmitted by way of the fiber optic light guide to the other end of the system where they are reconverted into electrical signals. Thus, the two ends of the system can be electrically isolated from each other; electrical interference does not affect the signals conducted over the optical transmission path.

Various techniques have been employed in the past for such transmission. The following references may be helpful for a delineation of the scope of such prior art techniques. They include the following United States Patents:

| U.S. Pat. No. | Patentee | Issue Date |
| --- | --- | --- |
| 3,517,981 | Rueger et al. | June 30, 1970 |
| 3,637,284 | Plyler | June 25, 1972 |
| 3,789,485 | Gudnestad | Feb. 5, 1974 |
| 3,790,791 | Anderson | Feb. 5, 1974 |
| 3,790,923 | Mathe | Feb. 5, 1974 |
| 3,792,284 | Kaelin | Feb. 12, 1974 |
| 3,809,908 | Clanton | May 7, 1974 |
| 3,846,010 | Love | Nov. 5, 1974 |

Also of interest is a publication titled "Designing with Du Pont Crofon Fiber Optics" by the Du Pont Company, including a designation A-76182.

Rueger et al., U.S. Pat. No. 3,517,981, relates to termination members for fiber optic means. Fiber members of a fiber optic bundle are crimped by a termination member so that the fibers project forward into a lens which engages the termination member, the lens being designed to disburse the light transmitted from the fiber optic bundle in many directions for observation or display.

The patents of Plyler and Gudnestad, U.S. Pat. Nos. 3,637,284 and 3,789,485 are of secondary interest.

Anderson, U.S. Pat. No. 3,790,791, discloses a fiber optic connector assembly including a fiber optic bundle which is adapted to mate with a transducer element. The bundle is disposed within a ferrule and a connector housing is provided with a tined release clip which is adapted to operatively mate with shoulder portions of the ferrule of the fiber bundle so as to retain same within the housing. The fiber optic bundle has a flush polished end with respect to the ferrule. In essence, the Anderson patent relates to a cable system wherein a connector assembly at one end of the system converts electrical energy to light energy. Light energy is transmitted through the cable system and converted to electrical energy at a second connector system located at the other end of the system. Anderson further utilizes a separate lens between his active device and the fiber optic termination. Disadvantageously, however, Anderson's transducer is a quasi-permanent portion of his optoelectronic cable assembly making replacement thereof difficult to obtain.

Mathe, U.S. Pat. No. 3,790,923, relates to an electrical connector having improved panel mounting means and an improved releasable contact construction. Mathe is concerned, inter alia, with connecting one set of electrical wires to another set of electrical wires; no mention is made by Mathe, however, of electrical-optical transmission.

Kaelin, U.S. Pat. No. 3,792,284, discloses a fiber optic connector assembly wherein the forward end of a fiber optic bundle is disposed within a sleeve in such a manner that the forward end is recessed within the sleeve and a transducer is disposed within the forward end of the sleeve so as to abut and mate with the bundle. Kaelin describes a unitary coupling device which provides structure which permanently positions and secures the light passing end of a fiber optic light guide and a photoelectric transducing element inside a sealed enclosure with electrical connectors from the transducing element to the outside. Once established, the interface between the light passing end of the light guide and the photoelectric transducing element remains undisturbed.

As further background of prior art believed to be pertinent, the following paragraphs are quoted verbatim from column 1, lines 9 to 38, of Kaelin:

"For certain applications it is desirable to transmit signals between two units of a system over a closed nonconductive nonelectrical transmission path. Such a path may be provided by a light pipe employing a flexible fiber optic light guide. Electrical signals are converted to light signals in one unit of the system and the light signals are transmitted by way of the fiber optic light guide to a second unit where they are reconverted to electrical signals. Thus, the two units of the system can be completely electrically isolated from each other and no electrical interference can affect the signals conducted over the optical transmission path."

"In a system of the foregoing type the ends of the fiber optic light guide must be properly positioned with respect to photo-electric transducing elements, a light source in the first unit and a photosensitive element in the second unit. Heretofore the usual practice has been to assemble the photo-electric transducing elements within the units between which the signals are to be sent, and then attach the fiber optic light guide to the units with the ends in light transmitting-receiving relationship with the photo-electric transducing elements. That is, optical connections were made between the fiber optic light guide and the units of the system. However, each reconnection of the fiber optic light guide to either of the units required careful physical adjustment in order to obtain proper coupling between the end of the light guide and the photo-electric transducing element, and care was necessary to avoid the presence of foreign matter between this interface."

To provide emphasis, as set forth above by Kaelin, a prior art problem of each reconnection of the fiber optic light guide to either of the photo-electric transducing elements required careful physical adjustment in order to obtain proper coupling between the end of the light guide and the photo-electric transducing element.

Clanton, U.S. Pat. No. 3,809,908, relates to an electro-optical transmission line for use in an interconnection system wherein an electrical signal is converted to an optical output signal by a light emitting diode. The optical light signal is transmitted by an optical fiber bundle to a light receiving diode which converts the optical signal back to an electrical signal. The optical bundle is terminated at its ends with coaxial electrical contact assemblies which mount the diodes. The contact assemblies may be mounted in standard electrical connector members. The electro-optical transmission line of Clanton has an electrical input and an electrical output, the conversion to and from light energy being performed within the connector members integrally associated with his transmission line.

Love, U.S. Pat. No. 3,846,010, describes an optical wave guide connector for joining two bundles of optical wave guides together so that corresponding fibers of the bundles mate with each other. Generally, fiber bundles are held by hexagonal or triangular shaped ferrules, the protruding fiber ends are cut off with a diamond saw and ground down with grinding paper. The ferrules are joined together with an alignment sleeve and index matching fluid is inserted between the ends of the fibers of the two bundles to eliminate insertion losses due to Fresnel reflections. Due to its geometry, the hexagonal ferrule can house, 7, 19, 37, 61, 91, 127, etc. fibers; the triangular ferrule can house 3, 6, 10, 15, 21, 28, 36, 45, etc. fibers.

The Du Pont Company publication "Designing with Du Pont Crofon Fiber Optics" suggests that Crofon light guides or optical fibers may be cut to length with a sharp razor blade, a guillotine type cutter, or a rotary knife. The Du Pont publication states that lenses can be used to collect more light at the input end of a light guide, and that lenses can be used at the output end of the light guide for increasing light intensity or to enlarge the light cone for broader visability.

In the prior art, it is noted that the term "fiber optic wave guide" and the term "fiber optic light guide" is used interchangeably. The term "fiber optic light guide" is used throughout the specification merely as a preference of usage, and is not meant to exclude the application of such guides outside of the visible light spectrum.

As a practical matter, electrical optical connectors are normally used in clean environments, such as office buildings and the like, wherein dirt and other foreign matter is not a problem in the reconnection of such connector parts. Typically, such electrical and optical connections are not made out-of-doors, near mud, dirt, sand, and other similar environments where foreign matter is a concern.

SUMMARY OF THE INVENTION

Another object of the invention is to provide a new and improved optoelectronic connector assembly having a photoelectric transducer element within one housing of the assembly and a fiber optic light guide coupled in another housing of the assembly, wherein each reconnection of the two housings does NOT require careful physical adjustment between the units in order to obtain proper coupling between the end of the light guide and the photoelectric transducing element.

Another object of the invention is to provide a new and improved optoelectronic connector assembly which does not require the use of a separate lens therein.

Still another object of the invention is to provide a novel optoelectronic connector assembly wherein a terminal end portion of a fiber optic light guide is integrally formed with a convex or curved surface thereon, wherein such surface may include such configurations as mushroom-shaped, hemispherical-shaped, or meniscus shaped end portions, such shapes being determined by the surface tension effect caused by an application of heat applied to the end of the fiber optic light guide.

Still another object of the invention is to provide a new and improved optoelectronic connector assembly wherein one part houses an optoelectronic transducer element and the other part houses a fiber optic light guide, and wherein the optoelectronic transducer element can be easily replaced.

Yet another object of the invention is to provide a novel optoelectronic connector assembly which does not require the addition of index fluid or sealing elements and the like.

Still another object of the invention is to provide a novel optoelectronic connector assembly wherein the assembly can be easily disengaged or reconnected without the use of any unusual special tools.

Another object of the invention is to provide a novel optoelectronic connector assembly which does not require the use of a highly polished end of a fiber optic light guide.

Another object of the invention is to provide an integral fiber optic light guide and associated lens wherein the lens is formed integral with the light guide by melting an end of the fiber optic material by the application of heat thereto so that a meniscus like lens is formed due to a surface tension effect of the fiber optic material.

An object of this invention is to provide for means for terminating a plastic based fiber optic light guide to a connecting device so as to facilitate connection or disconnection of the light guide without the necessity of tools.

It is an object of the invention to provide a new and improved photoelectronic connector assembly compatable with available commercial connectors, such assembly being suitable for carrying information via a fiber optic light guide between computer modules, data processing units, similar assemblies, and for voice transmission.

As will become more apparent from a reading of this specification, various novel features of this invention include that the fiber optic light guide is retained in an electrical type holder, the inner conductor of the fiber optic light guide being protected by a mechanical supporting means. The terminated fiber optic light guide is mounted in an individual cavity pocket in a connector housing. The terminated fiber optic light guide is seated and makes positive contact with an active transducer contained in the mating portion of the connector housing parts. The connector housings provide for elimination of extraneous light. The connector housings can be connected and disconnected without tools or the need for adjustment. The fiber optic light guide can be terminated, without special preparation, using available crimping machine tools. The input and/or output ends of the light guide can be formed with a meniscus shaped lens by the addition of heat to such ends.

In accordance with one embodiment of the invention, an optoelectronic connector assembly includes electrical and optical connector parts. Each part includes a housing formed of resilient material. One housing is formed with a keyway therewithin and the other housing has a mating key for engaging the keyway. A first of the housings has an interlock recess therein, and a second of the housings has a protuberance means formed thereon for engagement with the recess, so that both of the housings can positively engage with each other and so that such engaged housings can be manually disengaged from each other. The electrical connector part housing includes a first means for firmly positioning a photoelectric transducer element in a socket receiving cavity formed within the housing. The optical connector part housing is formed with a pin contact receiving cavity which is aligned with the socket receiving cavity of the electrical connector part housing when the housings are engaged with each other. The electrical connector part further includes second means for firmly positioning a terminal portion of a fiber optic light guide within the pin contact receiving cavity. Thus, both parts can be selectively engaged and disengaged and, when engaged, do thereby produce engagement of the transducer with the terminal portion of the fiber optic light guide without physical adjustment of either the transducer or the light guide portion, and wherein potential damage due to contact between the transducer and the terminal portion is significantly reduced due to the resiliency of the material of the housings. In accordance with certain features of the invention, the electrical and optical connector part housings are formed with a plurality of socket receiving cavities and of pin contact receiving cavities, respectively, the cavities of one part being aligned with the corresponding cavities of the other part when the housings are engaged with each other. In accordance with still other features of the invention, the protuberance means includes an inclined projecting ramp surface for at least partial engagement with the interlock recess to provide for increased resiliency between the housings when they are engaged. In accordance with other certain features, the combination includes a photoelectric transducer element positioned in the socket receiving cavity by the first firmly positioning means and a fiber optic light guide has a terminal portion positioned in the pin contact receiving cavity by the second firmly positioning means. With still other certain features, the end of the terminal portion of the fiber optic light guide is formed with a convex surface or, alternatively, a mushroom shaped surface, thereby providing a lens effect integrally associated with the fiber optic light guide.

In accordance with another embodiment of the invention, a signal transmission system includes an electronic output station having a light emitting optoelectronic element associated therewith. A first electrical connector part, associated with the electronic output station, positions the light emitting optoelectronic element therewithin. A second electrical connector part, associated with an electronic input station, positions a light responsive optoelectronic element therewithin. A first optical connector part is adapted to be positively engaged with, and manually disengaged from, the first electrical connector part. A second optical connector part is adapted to be positively engaged with, and manually disengaged from, the second electrical connector part. A first means are provided for firmly positioning a first terminal portion of a fiber optic light guide within the first optical connector part so that, when the first connector parts are engaged, the first terminal portion is in intimate association with the light emitting optoelectronic element. Similarly, second means are provided for firmly positioning a second terminal portion of the fiber optic light guide within the second optical connector part so that, when the second connector parts are engaged the second terminal portion is in intimate association with the light responsive optoelectronic element. Thus, the fiber optic light guide and the associated optical connector parts can be repeatedly disengaged from, and engaged with, the corresponding electrical connector parts without physical adjustment of either the optoelectronic elements or the light guide portions, and whereby signals can be transmitted from the electronic output station to the electronic input station via the fiber optic light guide. In accordance with certain features of the invention, the light emitting optoelectronic element can be a light emitting diode, while the light responsive optoelectronic element can be a photodiode.

In accordance with an embodiment of the invention an optoelectonic connector assembly includes electrical and optical connector parts, each having front end portions adapted to engage with each other. Means are provided for firmly supporting an optoelectronic transducer within the electrical connecotr part so that the transducer faces the front end thereof. Means are provided for rigidly and firmly positioning a terminal end portion of an optical fiber having material of light transmitting characteristics within the optical connector part so that the end of the fiber faces the front end thereof, thus rendering unnecessary any subsequent physical adjustment of the optical fiber with respect to the optical connector part. Such a connector assembly can be characterized by an absence of a separate lens between the transducer and the optical fiber. In accordance with certain features of the invention, the connector assembly can have as its optoelectronic transducer a photodiode. Alternatively, the optoelectronic transducer can be a light emitting diode. With other features of the invention, the front end portion of the optical fiber can be formed with a convexed end surface, a mushroom-shaped surface, or a curved surface thereby providing a lens effect integrally associated with the fiber. The curved surface can be determined by a surface tension effect of the optical fiber material after the end of the front end portion has been melted by an application of heat applied thereto.

In accordance with another embodiment of the invention, a fiber optic light guide has a lens integrally associated therewith, whereby the fiber optic conductor is constructed of light transmitting material having one of its ends formed with a curved surface to provide a lens effect integrally associated with the conductor. Such curved surface can be a convex, a mushroom-shaped, or a curved surface determined by the surface tension effect of the conductor material after its end had been melted by the application of heat applied thereto.

In accordance with still another embodiment of the invention, a novel method is provided for interconnecting an optical fiber to an electronic circuit by first and second engageable connector parts. The novel method includes the location of an optoelectronic element in the first connector part, electrically connecting the transducer to the circuit, rigidly and firmly locating the optical fiber in the second cinnector part with an end of the fiber in alignment with and in juxtaposition to the transducer when the parts are aligned, and engaging the connector parts.

In accordance with another embodiment of the invention, means are provided for interconnecting an optical fiber of light transmitting material to an electronic circuit. Such means includes optical and electrical connector parts engageable with each other. An optoelectronic transducer is housed within the electrical connector part by suitable positioning means. The transducer is electrical connected to the circuit. Also, means are provided for rigidly and firmly positioning a terminal end portion of the optical fiber within the optical connector part so that an end of the fiber is in alignment, and in juxtaposition, with the transducer when the parts are engaged. Means are associated with the parts for positive but resilient engagement thereof, thus providing for manual disengagement thereof. In accordance with certain features of the invention, the end of the fiber can be formed with a curved surface, which surface can be determined by a surface tension effect of the optical fiber material after its end has been melted by an application of heat applied thereto, thereby providing a lens effect integrally associated with the fiber.

In accordance with another embodiment of the invention, a combination is provided including an electrical connector part and an optical connector part engageable therewith and manually disengageable therefrom. The electrical connector part has a socket receiving cavity therein, including a recessed bore which faces in the direction of the optical connector part when the parts are engaged. An optoelectronic transducer, including a main body and a lead attached thereto, has its main body seated in the bore with the lead extending through at least a portion of the cavity. Opaque conductive coupling means has a first portion located in the cavity and a second portion extending outwardly away from the electrical connector part. The first portion of the opaque conductive means provides an electrical connection to the transducer lead, heat dissipation away from the transducer body, general alignment of the transducer, and isolation of light to and from the cavity in a direction perpendicular to a main axis of the cavity. The second portion is adapted to be soldered to an electronic circuit. In accordance with certain features, the electrical connector part is mounted to a printed circuit board having an electronic circuit thereon.

In accordance with still another embodiment of the invention, the connector assembly includes two connector parts, each including a housing formed of resilient material, one housing having a mating key for engaging with a keyway formed in the other housing. A first of the housings has a protuberance means formed thereon for engagement with an interlock recess in a second of the housings so that both housings can be positively engaged with each other and so that such engaged housings can be manually disengaged from each other. The first connector part housing is formed with a socket receivng cavity. The second connector part housing is formed with a pin contact receiving cavity which is aligned with the socket receiving cavity of the first connector part housing when the housings are engaged with each other. The second connector part housing has a reduced bore within the pin contact receiving cavity, one side of the reduced bore forming an annular shoulder with the pin contact receiving cavity and an opposite side of the bore forming a common annular retention shoulder with the pin contact receiving cavity. An optical fiber light guide has an inner fiber of light transmitting material and an outer jacket. The light guide has a terminal end portion with the jacket removed. Pin contact means are adapted to be received within the pin contact receiving cavity. The pin contact means includes, from rear to front, a first crimpable section adapted to be crimped about the outer jacket of the light guide, a second crimpable section adapted to be crimpted about the inner fiber of the light guide, a resilient collar adapted to have a slight pressed fit with respect to the pin contact receiving cavity so as to permit it serving as a stabilizer to maintain the pin contact means securely aligned after insertion, keylike embossments for contact in the first named annular shoulder for providing a positive multi-point stop for an inserted pin contact means and thus serving to prealign such inserted pin contact means in proper position, and releasable retention means for cooperating with the common annular retention shoulder.

In accordance with yet another embodiment of the invention, a lens can be formed on an end of a fiber optic conductor of a fiber optic light guide by a method including the heating of the end of the conductor so that the end forms a meniscus shaped surface determined by a surface tension effect of the conductor material.

In accordance with still yet another embodiment of the invention, an optical connector part housing having a fiber optic light guide as its terminal portion can be formed by a method including firmly and rigidly positioning a terminal portion of the fiber optic light guide within a cavity of the optical connector part housing. In accordance with certain features, the terminal portion of the fiber optic light guide is positioned in the optical connector part housing by a method including, first, crimping a first section of a rigid member about an outer jacket of a fiber optic light guide, then, crimping a second section of the rigid member about an inner conductor of said fiber optic light guide and, last, firmly engaging the rigid member within the cavity of the optical connector part housing.

Another embodiment of this invention includes a method of interconnecting an optical fiber to an electronic circuit at a station by locating an optoelectronic transducer in a first connector part, affixing the first part to the station, electrically connecting the transducer to a circuit, firmly and rigidly locating the optical fiber in a second connector part which is engageable with the first connector part with an end of the fiber in alignment with and in juxtaposition with the transducer when the parts are engaged, and then engaging the connector parts.

In another embodiment of the invention, a method of signal transmission includes positioning a first electrical connector part housing a light emitting optoelectronic element at an electronic output station. A second electrical connector part housing a light responsive optoelectronic element is positioned at an electronic input station. A first terminal portion of a fiber optic light guide is firmly positioned within a first optical connector part. The first optical connector part with the first electrical connector part is engaged so that the first terminal portion of the fiber optic light guide is rigidly held in intimate associstion with the light emitting optoelectronic element. In similar fashion, a second terminal portion of the fiber optic light guide is firmly positioned within a second optical connector part, and the second optical connector part is engaged with the second electrical connector part, so that the second terminal portion of the fiber optic light guide is rigidly held in intimate association with the light responsive optoelectronic element. Thus, the optical connector parts and the electrical parts can be repeatedly engaged with and disengaged from each other without physical adjustment of either the optoelectronic elements or the light guide portions so that signals can be transmitted from the electronic output station to the electronic input station via the fiber optic light guide.

BRIEF DESCRIPTION OF THE DRAWINGS

Other objects and advantages of this invention, together with its construction and mode of operation, will become more apparent from the following specification, when read in conjunction with the accompanying drawings, in which.

DESCRIPTION OF THE INVENTION

Figure 1:
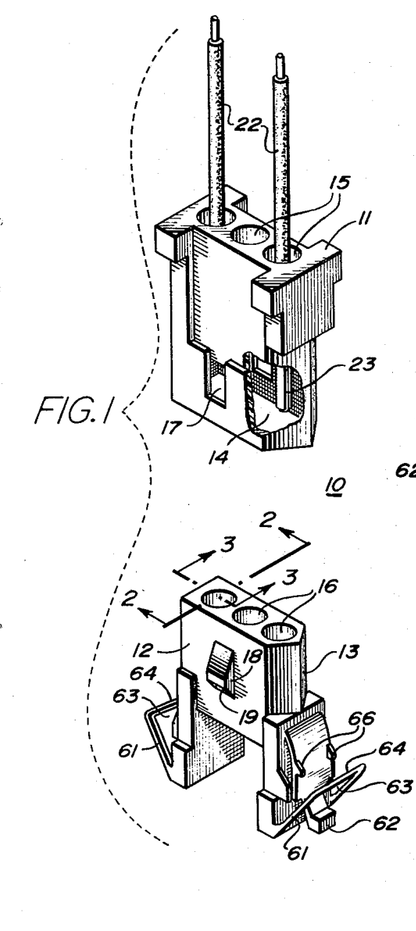
FIG. 1 is a perspective view, partly in section, of an optoelectric connector assembly in accordance with one embodiment of this invention.

In the drawings, like reference numerals refer to corresponding similar elements. Referring to FIG. 1, an optoelectronic connector assembly 10 includes an optical connector 11 and an electrical connector 12, the housings of which are adapted to resiliently but firmly engage with each other. The electrical connector 12 contains a key 13 which is adapted to fit within a keyway 14 of the optical connector 11 so as to provide for desired orientation of the two connectors 11, 12.

It is noted that the present invention is primarily directed to an optoelectronic connector assembly and methods relating to improvements therein. Hence, various connector portions may be conventional. Accordingly, such conventional portions are referred to only briefly and generally in the description, since they may readily be provided by those skilled in the art.

The optical connector housing 11 includes pin contact receiving cavities 15 extending axially therethrough. Similarly, the mating electrical connector housing 12 has socket receiving cavities 16 suitably formed therein.

In order to provide for the interconnection and locking together of the two housings 11 and 12, an interlock slot or recess 17 is provided on one side of the housing 11 for cooperative locking engagement with a protuberance 18 on the corresponding side of the electrical connector housing 12. The protuberance 18 includes an inclined ramp surface 19 which engages with the interlock recess 17 to urge the two connector housings 11, 12 together in a resilient manner.

Figure 2:
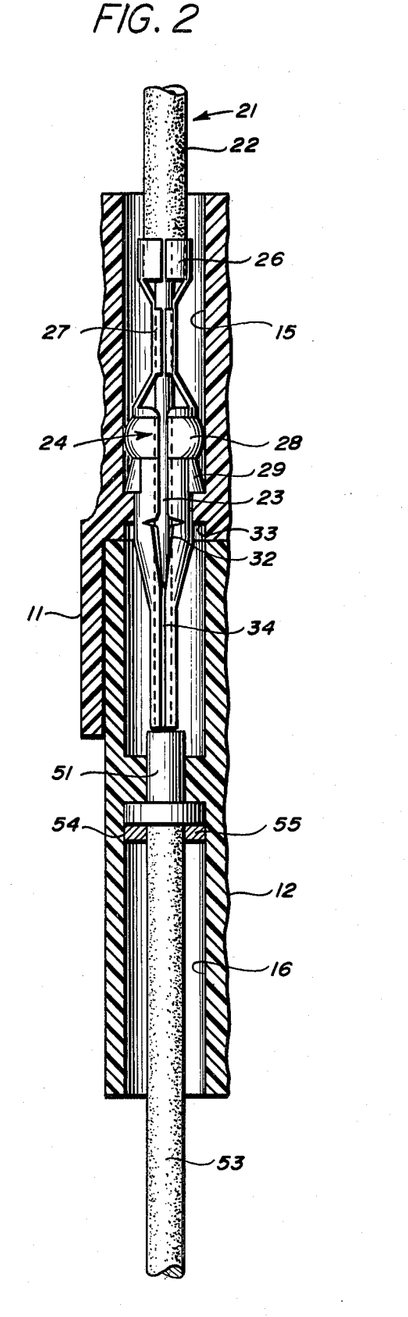
FIGS. 2 and 3 are front and side longitudinal cross-sectional views, taken along the lines 2—2 and 3—3, respectively, of FIG. 1, illustrating the construction and mating of engaged optical connector components with electrical connector components, in accordance with one embodiment of the invention.
Figure 3:
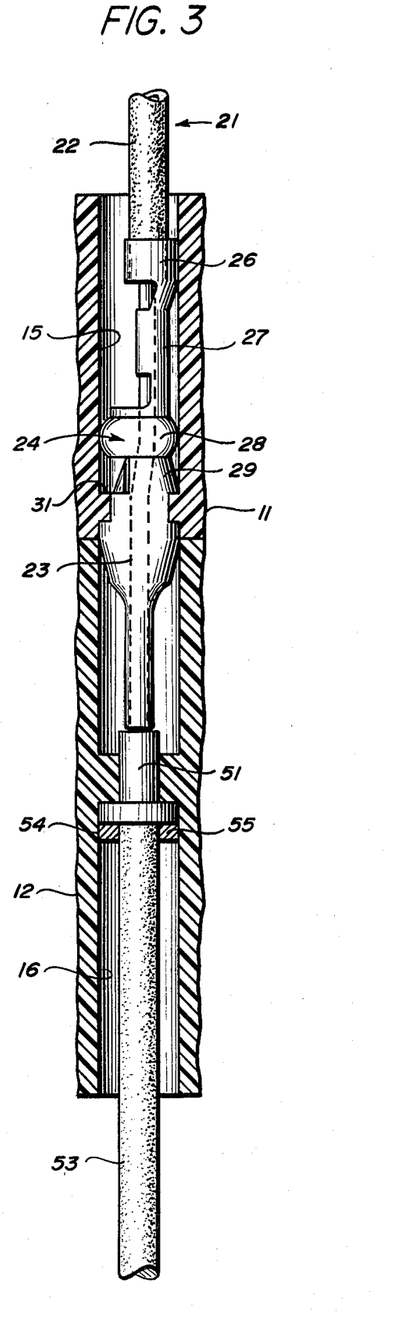

Referring more particularly to FIGS. 2 and 3, the optical connector housing 11 is adapted to hold a terminal end portion of a fiber optic light guide 21 having an outer jacket 22 and an inner fiber light conducting core 23. The fiber optic light guide 21 can be either constructed of glass or suitable plastic material. One such suitable light guide can include that sold under the trade name Crofon by the Du Pont Company. An inner plastic fiber 23 of a Crofon fiber optic light guide 21 is made of material of polymethyl methacrylate which is sheathed with a transparent polymer of lower refractive index. The outer jacket 22 can be constructed of Du Pont Alathon brand of polyethylene resin.

The terminal portion of the fiber optic light guide 21 can be held firmly and rigidly in place within the pin contact receiving cavity 15 by suitable firmly positioning means such as a terminating device 24, best shown in FIGS. 2 and 3. As a rigid member, the termination device 24 operates, in effect, as a pin contact means.

The terminating device 24 is hollow to receive and accommodate the outer diameter of a selected fiber optic light guide 21. The light guide 21 is held in the terminating device 24 by one or more crimped bands. As shown in FIG. 2, the outer jacket 22 of the fiber light guide is crimped by a first crimpable section 26 of the terminating device 24 while the inner conductor 23 is crimped by a second crimpable section 27, the crimpable sections 26, 27 being integral portions of the contact member 24. The end of the fiber optic light guide projects through the hollow section of the terminating device 24 and is installed or cut so that the terminal end of the light guide fiber 23 is substantially flush with the open of the termination. A lens or meniscus can be created at the end of the light guide fiber 23 by an application of heat. The pin contact means 24 is insertable into the pin contact receiving cavity 15 of the optical connector housing 11. The pin contact means 24 includes, forward of the second crimpable section, as shown at FIGS. 2 and 3, a resilient collar 28 having a slight pressed fit with respect to the cavity 15 so as to permit it serving as a stabilizer to maintain the contact securely aligned after insertion. Immediately ahead of the collar 28 are keylike embossments 29 which contact an annular shoulder 31 in the cavity 15 and provide a positive multi-point stop for an inserted contact 24. This multi-point stop additionally serves to prealign the contact 24 in proper position.

Further forward of the embossments 29, the contact means 24 is provided with releasable retention means such as flares 32 cooperating with a common annular retention shoulder 33. The retention means can comprise a deflectable retention tine (not shown) provided on one side of the contact means 24 and two outwardly projecting retention flanges or flares 32 (see FIG. 2) provided on the opposite side of the contact means and on opposite sides of a suitable slot 34, so that the deflecting tine is deflectable into an appropriate opening provided therein, such as set forth for example in the connector described in Mathe patent, U.S. Pat. No. 3,790,923.

Figure 4A:
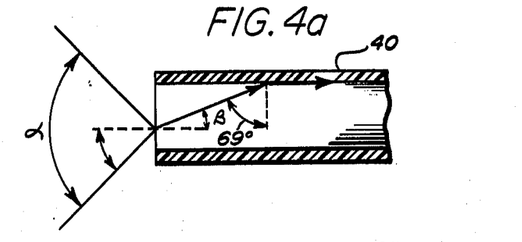
FIGS. 4a, 4b, and 4c are diagrams indicating the path of light ray entering a planar end surface of a light guide in accordance with prior art techniques, and illustrating the path of light rays entering and leaving, respectively, a light guide having a convex or mushroom-shaped end in accordance with an embodiment of this invention.

As stated above, the inner conductor 23 of the fiber optic light guide 21 can have its end formed either flat or formed with a meniscus. As shown, FIG. 4a diagrammatically represents the typical acceptance angle $\alpha$ of an impinging light ray entering the core 40 of a fiber optic light guide. The light ray enters the core 40 at its end surface and is refracted to an angle $\beta$ with respect to the main axis of the conductor 40 so that the light, upon striking the sides of the core 40, is directed along the axis of the core. A 69° angle, shown in FIG. 4a, is the critical angle of a Crofon light guide, as described by the Du Pont Company.

Figure 4B:
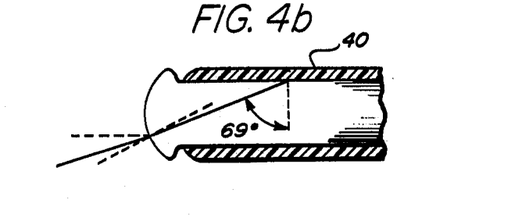
Figure 4C:
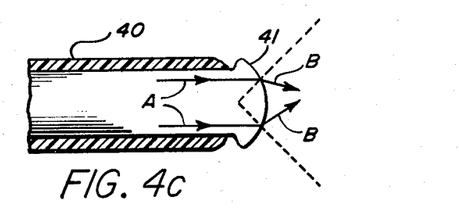

Referring to FIG. 4b, there is depicted a similar path of light entering a Crofon light guide, wherein the end, in lieu of being formed with a flat surface or planar surface, is mushroom shape, preferably obtained by heating the end so as to form a meniscus determined by a surface tension effect of the plastic material of the core 40. Again, assuming the critical angle 69°, it is noted that acceptable light enters from a direction more acute with the axis of the core 40 than in the corresponding case of FIG. 4a. In FIG. 4c, however, it is more apparent that axial light along the arrows A—A is refracted by the meniscus 41 so that the light rays converge as shown by the arrows B—B. The convergence of light can be directed upon a suitable light responsive device and, due to the convergence, increaed efficiency can be obtained.

Figure 5:
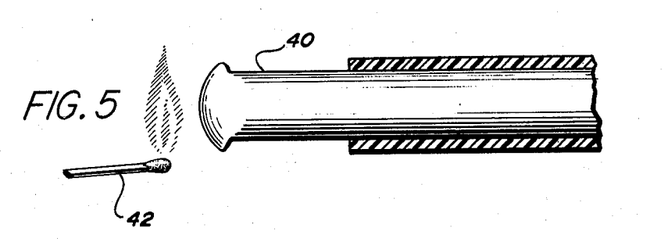
FIG. 5 is a diagrammatic view illustrating the end of a plastic fiber being heated so as to provide a meniscus formed end thereon, in accordance with another embodiment of this invention.

FIG. 5 illustrates that an inner core 40 of suitable plastic material, such as a Crofon polymethyl methacrylate, can be heated by a suitable means such as a cigarette lighter, a match 42, or other form of heat applicator to obtain a meniscus shape at the end of the core 40.

Referring again to FIGS. 2 and 3, the terminating device 24, maintains a terminal end portion of the fiber optic light guide 21 in a centered and fixed or semifixed position. When in position, the light guide 21 is terminated and installed in the body cavity 15 of the housing 11 and the conducting core 23 is centered in relationship to the corresponding cavity 16 in the electrical connector housing 12. The inner conductor 23 of the light guide 21 in the housing 11 is of such length so as to touch an active optoelectronic transducer element 51 mounted in electrical connector housing 12 of the connector assembly 10.

The optoelectronic transducer 51 can take the form of either a light responsive device or a light emitting device. A suitable light responsive device can be a photodiode, while a light emitting device can be a light emitting diode or LED. Suitable light emitting devices can be such as L209 sold by the Texas Instrument Corporation.

Figures 6A, 6B, 6C:
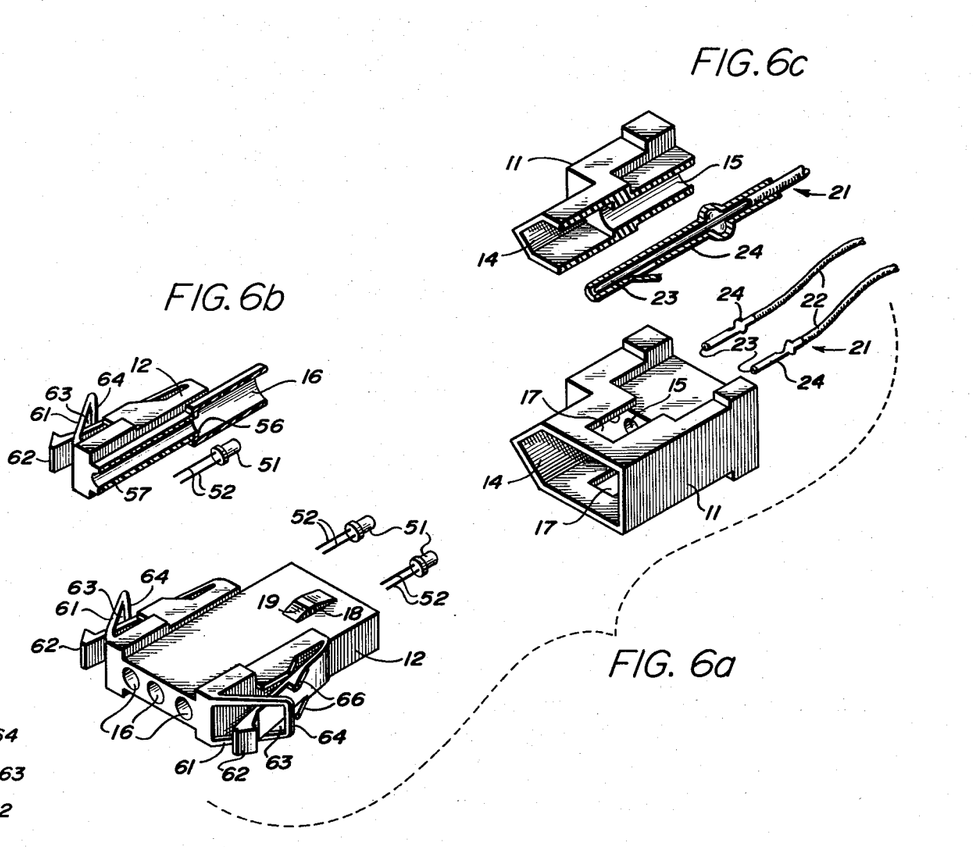
FIGS. 6a, 6b, and 6c are an exploded perspective view of a connector assembly including an electrical connector and a optical connector, a perspective exploded sectional view of the electrical connector, and a perspective exploded sectional view of the optical connector, respectively, of an embodiment of this invention.

The optoelectronic transducer element 51 can be inserted into the corresponding socket receiving cavity 16 of the electrical connector housing 12. The transducer element 51 can include a plurality of leads 52—52 in one form, as depicted in FIGS. 6a and 6b. Alternatively, the element 51 can have a central conductor 53 (as shown in FIGS. 2 and 3) and have an outer base conductive ring which can be coupled to a metal contact within the housing 12 (not shown). The transducer element 51 is mounted in a socket 54 (FIGS. 2 and 3) by suitable mounting material 55. The transducer 51 can be mounted in a recessed socket 56 as shown in FIG. 6b.

Figure 7A:
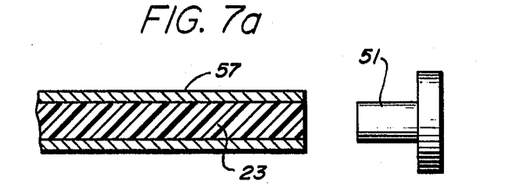
FIGS. 7a, 7b, and 7c are sectional views illustrating the connection of various types of transducers with a metallic socket for use with an electrical connector part in accordance with an embodiment of the invention.
Figure 7B:
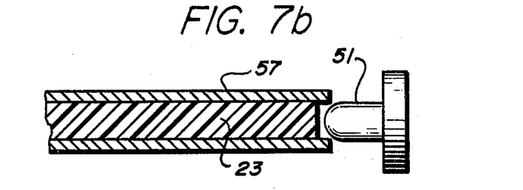
Figure 7C:
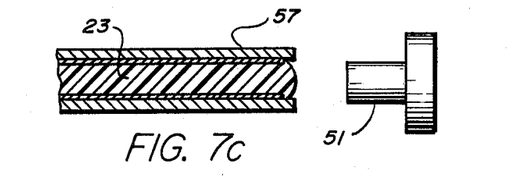

The optoelectronic transducer 51 can take various forms. It can be a top hat type shape as depicted in FIG. 7a, or can have a domed shape as shown in FIG. 7b. The inner conductor 23 can have a flat face as shown in FIG. 7a or can have a lens like shape as shown in FIG. 7c. In the versions shown in FIGS. 7a, 7b, and 7c, the inner conductor 23 fits within a hollow metallic memter 57 so as to provide for firm and rigid support of the conductor 23 and to provide for heat dissipation from the end of the transducer 51. The member 57 can be the terminal portion of the contact means 24.

The electrical connector part 12, as shown in FIGS. 1 and 6a, can have a panel mounting means integrally provided thereon so that the connector housing 12 can be coupled to a printed circuit board or the like or other type of panelling. For example, the housing 12 can have a pair of opposing resilient wings 61—62 formed of preset, semirigid thermoplastic material provided on oppoite side walls of the housing 12. The wings 61—62 project angularly from the housing 12 toward one another with the snap-in wing 62 projecting through a centrally located aperture 63 provided in the stop wing 61. Each of the stop wings 61 is provided with a bearing surface 64 for resiliently bearing against the entry side of a panel when the connector part 12 is mounted therein. The stop wing bearing surface 64 is provided on a lateral bar portion of the stop wing 61, extending parallel to and spaced from the side wall of the housing 12. A bearing surface 66 is provided on the snap-in wing for resiliently bearing against the outward side of a panel after insertion. The construction, arrangement and operation of the stop and snap-in wings 61 and 62 are such that, during insertion of the connector part 12 in a panel, the snap-in wings 62 first encounter the panel which causes them to deflect inwardly so as to permit passage of the locking lips of the snap-in wings 62 through the panel opening. After passing through the panel opening, the snap-in wings 62 swing back to cause the locking lips to resiliently lock the connector part in the panel between the stop wing and the snap-in wing bearing surfaces.

Figure 8:
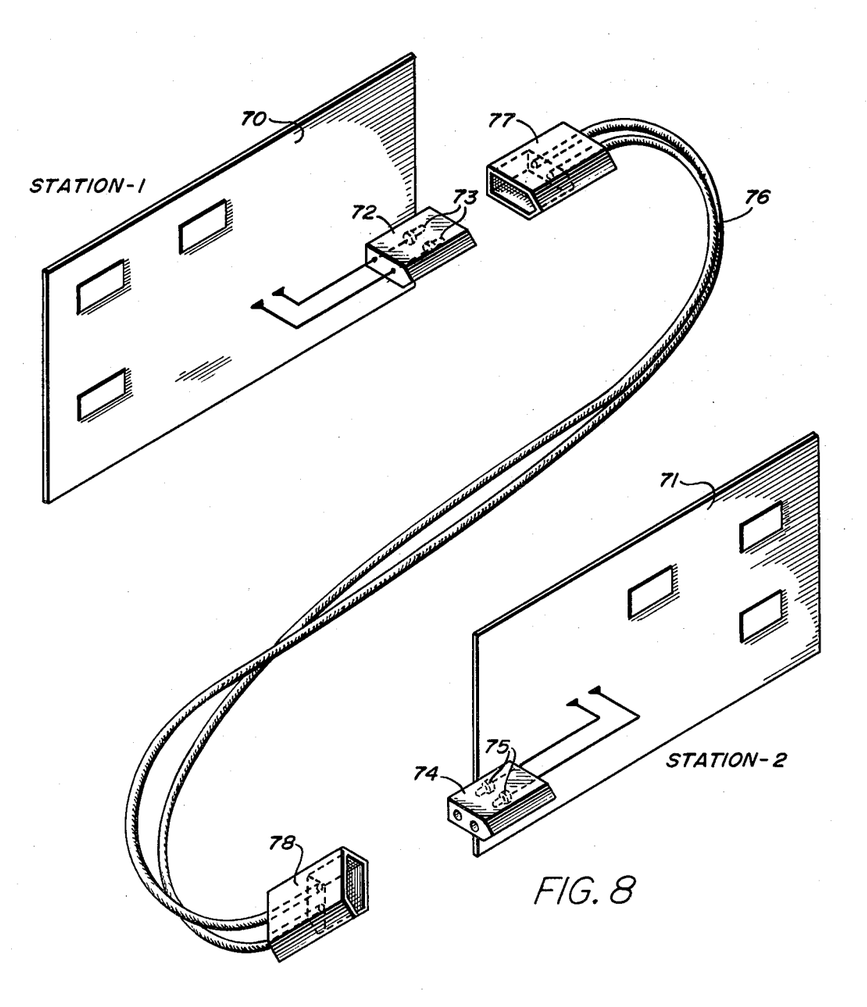
FIG. 8 is a diagrammatic view of a signal transmission system in accordance with another embodiment of the invention.

A signal transmission system can be provided to transmitting signals from one unit to another, such as an electrical output station 70 which can include a printed circuit unit or a printed circuit board, to an electrical input station 71 which, again, can include a printed circuit board. This can be achieved by coupling a first electrical connector part 72, which houses a transducer 73, to the printed circuit board 70. Similarly, a second electrical connector part 74, which houses a transducer 75, can be directly coupled to the printed circuit board 71. Leads from the transducer 73, 75 can be connected to the respective stations 70, 71 with known techniques. Hence, the input station printed circuit board 70 has, as an affixed part of the unit, the electrical connector part 72 housing the transducer 73, which the input station 71 has, as an affixed portion thereof, the electrical connector part 74 which houses the transducer 75. Signals between the two stations 70 and 71 can be coupled via a fiber optic light guide 76 which is joined at one end to an optical connector 77 and at its other end to an optical connector 78. The optical connector 77, which is terminated by an end of the optical light guide 76, can be resiliently and firmly and rigidly coupled to the first electrical connector 72. Similarly, the optical connector 78 can be resiliently and firmly and rigidly connected to the electrical connector 74. If desired, an optical connector 77, 78 can be disengaged from its corresponding electrical connector 72, 74 manually and can be simply re-engaged thereafter.

The signal transmission system shown in FIG. 8 depicts two transducers at each station, coupled together with two fiber optic light guides. Such description and illustration is not meant to limit the scope of this invention in that one or more than two transducers at each station can be coupled to its corresponding member at the other station. Also, a single light guide having a plurality of fiber conductors therein can be used in lieu of multiple light guides, if desired.

Figure 9A:
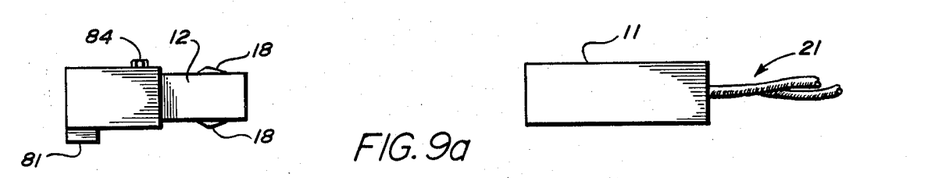
FIGS. 9a, 9b, and 9c are a side view, a top view, and a cross sectional view, respectively, of another embodiment of the invention.
Figure 9B:
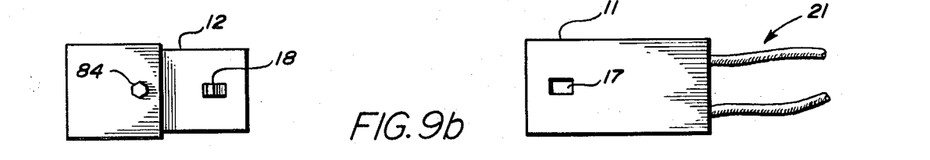
Figure 9C:
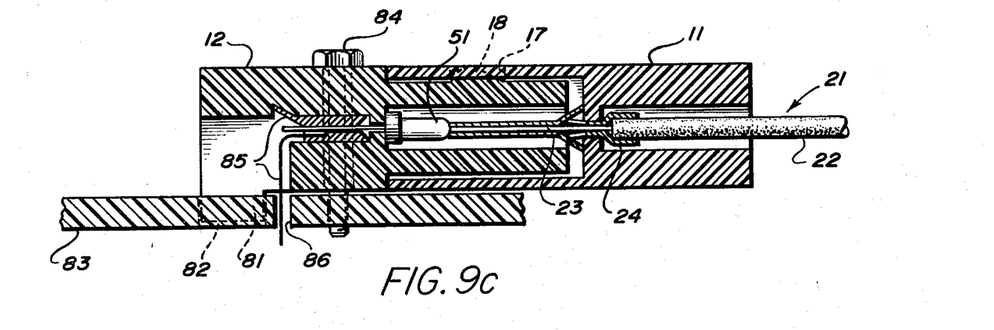

Another form for connecting an optoelectronic connector assembly together in which its electrical housing 12 can be coupled to a printed circuit board or other mounting is shown in FIGS. 9a, 9b, and 9c. The optical connector housing 11 positions one or more fiber optic light guides 21 therein, shown at the right hand side of the drawings, in a fashion similar to that described hereinabove. On the left hand side of the drawings, however, the electrical connector housing 12 includes an L shaped extension arm 81 which is adapted to fit into a recess 82 of a printed circuit board 83 or other mounting. The connector housing 12 can be physically attached to the board or mounting 83 by suitable means 84, such as a screw, rivet, bolt and nut, and the like. The attaching means 84 can also act as a means for dissipating heat which may be present in the connector part 12. The transducer 51 can be physically held in place by an opaque conductive contact means 85, a forward portion of which is coupled within the recess or socket of the housing 12 so that one end of the contact means 85 physically contacts the lead of the transducer 51, the other end of the contact means 85 coming out through an opening 86 in the board 83 so as to be soldered or connected to a circuit on the board, as desired. The contact 85 acts to aid in alignment of the transducer 51, provide physical contact thereto for the purpose of electrical connection, and also for the purpose of heat dissipation therefrom. The contact 85 can also act to inhibit the passage of light from one socket cavity to another socket cavity in the same connector housing 12.

Typical dimensions for a light emitting diode, such as the L-209 type include leads which have a minimum length of 0.5 inch with such leads having a cross-section of approximately 0.20 inch. The diameter of the transducer can have an inner diameter of approximately 0.12 inch and an outer diameter of approximately 0.15 inch. The length of the main body of a transducer can be approximately 0.20 inch.

Though the end face of a plastic optical fiber can be flat, hemispherical, or meniscus shape, the end of a glass fiber is usually ground flat.

Although, generally, a connector assembly has been described utilizing one optical fiber light guide and one transducer per connector assembly, more than one such fiber and transducer per connector assembly can be accommodated, as illustrated in the drawings. However, there is no limitation as to the number that may be used. For example, 1, 2, 3, 4, or any integral number can be joined together by an appropriate optical connector housing to a corresponding electrical connector housing to complete such assembly. Furthermore, though a fiber optic light guide has been described throughout the specification as having a single conductor, it is well known however, that various light guides may have more than one conductor and such multiconductor fiber optic light guide can be used in a multi-conductor connector assembly, as will be well recognized by those skilled in the art. Various other modifications and variations will suggest themselves without departing from the spirit and scope of the appended claims.

What is claimed is:

1. An optoelectronic connector assembly comprising an electrical connector part and an optical connector part, said parts each including a housing formed of resilient material, one housing being formed with a keyway therewithin and the other housing having a mating key for engaging with said keyway, a first of said housings having an interlock recess therein and a second of said housings having protuberance means formed thereon for engagement with said recess so that both of said housings can positively engage with each other and so that such engaged housings can be manually disengaged from each other, said electrical connector part housing being formed with a socket receiving cavity, said electrical connector part further comprising first means for firmly positioning a photo-electric transducer element in said socket receiving cavity; and said optical connector part housing being formed with a pin contact receiving cavity, said pin contact receiving cavity, said pin contact receiving cavity being aligned with the socket receiving cavity of said electrical connector part housing when said housings are engaged with each other, and said optical connector part further comprising second means for firmly positioning a terminal portion of a fiber optic light guide within said pin contact receiving cavity, whereby said parts can be selectively engaged and disengaged, and, when engaged, to thereby produce engagement of said transducer element with said terminal portion of said fiber optic light guide without physical adjustment of either said transducer element or said light guide portion, and wherein potential damage due to contact between said transducer element and said terminal portion is significantly reduced due to the resiliency of the material of said housings.

2. The assembly as recited in claim 1 wherein said electrical connector part housing is formed with a plurality of socket receiving cavities, and wherein said optical connector part housing is formed with a like plurality of pin contact receiving cavities, the cavities of one part being aligned with the corresponding cavities of the other part when said housings are engaged with each other.

3. The assembly as recited in claim 1 wherein said protuberance means includes an inclined projecting ramp surface for at least partial engagement with said interlock recess to provide for increased resiliency between said housings when engaged.

4. The combination as recited in claim 1 further comprising a photo-electric transducer element positioned in said socket receiving cavity by said first firmly positioning means; and a fiber optic light guide having a terminal portion positioned in said pin contact receiving a cavity by said second firmly positioning means.

5. The combination as recited in claim 4 wherein the end of said terminal portion is formed with a convex surface, thereby providing a lens effect integrally associated with said fiber optic light guide.

6. The combination as recited in claim 4 wherein the end of said terminal portion is formed with a mushroom-shaped surface, thereby providing a lens effect integrally associated with said fiber optic light guide.

7. A signal transmission system comprising
an electronic output station for emitting electrical output signals,
a light emitting optoelectronic element electrically connected to said electronic output station and responsive to the electrical output signals to produce light output signals,
a first electrical connector part associated with said electronic output station and mounting said light emitting optoelectronic element therewithin,
an electronic input station for receiving electrical signals,
a light responsive optoelectronic element electrically connected to said electronic input station,
a second electrical connector part associated with said electronic input station and mounting said light responsive optoelectronic element therewithin,
a fiber optic light guide for carrying light signals,
a first optical connector part adapted for releasable engagement with said first electrical connector part,
first means mounting and firmly positioning a first terminal portion of said fiber optic light guide within said first optical connector part so that, when said first electrical and light connector parts are engaged, said first terminal portion is in intimate association with said light emitting optoelectronic element to receive the light output signals,
a second optical connector part adapted for releasable engagement with said second electrical connector part, and
means mounting and firmly positioning a second terminal portion of said fiber optic light guide within said second optical connector part so that, when said second optical and electrical connector parts are engaged, said second terminal portion is in intimate association with said light responsive optoelectronic element to transmit light signals thereto,
whereby said fiber optic light guide and the associated optical connector parts can be repeatedly disengaged from and engaged with the corresponding electrical connector parts without physical adjustment of either said optoelectronic elements or said light guide terminal portions.

8. The system as recited in claim 7 wherein said light emitting optoelectronic element is a light emitting diode, and said light responsive optoelectronic element is a photodiode.

9. An optoelectronic connector assembly comprising
an electrical connector part having a front end portion,
an optical connector part having a front end portion adapted to engage with the front end portion of said electrical connector part,
an optoelectronic transducer,
means firmly supporting said transducer within said electrical connector part so that said transducer faces the front end of said electrical connector part,
an optical fiber having material of light transmitting characteristics, and
means rigidly and firmly positioning a terminal end portion of said optical fiber within said optical connector part so that the end of said fiber faces the front end of said optical connector part, and
therein said latter means renders unnecessary any subsequent physical adjustment of said optical fiber with respect to said optical connector part.

10. The connector assembly as recited in claim 9 characterized by an absence of a separate lens between said transducer and said optical fiber.

11. The connector assembly as recited in claim 9 wherein said optoelectronic transducer is a photodiode.

12. The connector assembly as recited in claim 9 wherein said optoelectronic transducer is a light emitting diode.

13. Means for interconnecting an optical fiber of light transmitting material to an electronic circuit comprising
an optical connector part,
an electrical connector part engageable with said optical connector part,
an optoelectronic transducer within said electrical connector part,
means mounting said transducer in said electrical part,
means for electrically connecting said transducer to said circuit,
means for rigidly and firmly positioning a terminal end portion of said optical fiber within said optical connector part so that an end of said fiber is in alignment with and in juxtaposition with said transducer when said parts are engaged, and
means associated with said parts for positive but resilient engagement of said parts, said associated means providing for manual disengagement of said parts.

14. The invention as recited in claim 13, wherein the end of said fiber comprises a curved surface determined by the surface tension of said optical fiber material after said end has been melted by an application of heat thereto, thereby providing a lens effect integrally associated with said fiber.

15. In combination,
an electrical connector part,
an optical connector part adapted to be engageable with said electrical connector part and manually disengageable therefrom,
said electrical connector part having a socket receiving cavity therein, including a recessed bore in said cavity facing in the direction of said optical connector part when said parts are engaged,
an optoelectronic transducer including a main body and a lead attached thereto, said main body being seated in said bore with said lead extending through at least a portion of said cavity, and
opaque conductive coupling means having a first portion located in said cavity and a second portion extending outwardly away from said electrical connector part, said first portion of said opaque conductive means providing (1) an electrical connection to said transducer lead, (2) heat dissipation away from said transducer body, (3) general alignment of said transducer, and (4) isolation of light to and from said cavity in a direction perpendicular to a main axis of said cavity, said second portion being adapted to be soldered to an electronic circuit.

16. The combination as recited in claim 15 further comprising means for mounting said electrical connector part to a printed circuit board having an electronic circuit thereon.

17. In combination, a connector assembly comprising a first connector part and a second connector part, said parts each including a housing formed of resilient material, one housing being formed with a keyway therewithin and the other housing having a mating key for engaging with said keyway, a first of said housing having an interlock recess therein and a second of said housings having protuberance means formed thereon for engaging said recess so that both said housings can positively engage with each other and so that such engaged housings can be manually disengaged from each other, said first connector part housing being formed with a socet receiving cavity, said second connector part housing being formed with a pin contact receiving cavity, said pin contact receiving cavity being aligned with the socket receiving cavity of said first connector part housing when said housings are engaged with each other, said second connector part housing having a reduced bore within said pin contact receiving cavity, one side of said reduced bore forming an annular shoulder with said pin contact receiving cavity and an opposite side of said bore forming a common annular retention shoulder with said pin contact receiving cavity, an optical fiber light guide having an inner fiber of light transmitting material, and an outer jacket, said light guide having a terminal end portion with said jacket removed, and pin contact means adapted to be received within said pin contact receiving cavity, said pin contact means having, from rear to front,
(1) a first crimpable section, adapted to be crimped about said outer jacket of said light guide,
(2) a second crimpable section, adapted to be crimped about said inner fiber of said light guide,
(3) a resilient collar adapted to have a slight press fit with respect to said pin contact receiving collar so as to permit its serving as a stabilizer to maintain said pin contact means securely aligned after insertion,
(4) keylike embossments for contacting said first named annular shoulder for providing a positive multi-point stop for an inserted pin contact means and thus serving to pre-align such inserted pin contact means in proper position, and
(5) releasable retention means for cooperating with said common annular retention shoulder.

18. A method of making an optoelectrical connector comprising the steps of:
affixing a sleeve, having intermediate forward facing and rearward facing retention times, about a terminal portion of a fiber optic light guide;
providing a first stop on a first connector part housing;
providing forward and rearward facing surfaces in a cavity of the first connector part housing at a first predetermined distance from the first stop of the housing;
inserting the sleeve into the cavity until the forward and rearward facing retention tines engage the respective rearward and forward facing surfaces in the cavity thereby mounting the terminal portion of the light guide at a predetermined position;
providing a second stop on a second connector part housing for engagement with the first stop;
affixing an optoelectronic transducer between forward and rearward facing retention elements in a cavity of a second connector part housing, which is matable with the first connector part housing, by securing the transducer at a second predetermined distance from the second stop of the second connector part,
wherein the first and second predetermined distances are selected to provide intimate association of the end of the terminal portion of the light guide and the optoelectronic transducer when the connector housings are mated with the first and second stops engaged.

19. An optoelectronic connector comprising:
first and second telescopically matable connector housings, including a first passageway and a second passageway therethrough, respectively, and first and second stops, respectively, for abutting engagement;
a fiber optic light guide including a terminal portion and an end at said terminal portion;
a terminal sleeve element secured about said terminal portion and extending to said end thereof, said sleeve including forward and rearward facing retention tines;
a reduced diameter portion in said first passageway defining forward and rearward facing surfaces engaging said rearward and forward facing retention tines, respectively, said reduced diameter portion being at a first predetermined distance from said stop;
a rearward facing surface in said second passageway at a second predetermined distance from said second stop;
an optoelectronic transducer including a radial flange said transducer disposed in said second passageway with said flange against said rearward facing surface; and
retaining means in said second passageway securing said flange to said rearward facing surface,
said first and second predetermined distances selected to provide intimate association of said transducer and said end of said light guide when said housings are mated with said first and second stops engaged.

20. An optical connector comprising:
first and second telescopically matable connector housings, including a first passageway and a second passageway therethrough, respectively, and first and second stops, respectively, for abutting engagement;
a fiber optic light guide including a terminal portion and an end at said terminal portion;
a terminal sleeve element secured about said terminal portion and extending forward toward said end to a point which is at least adjacent said end, said sleeve including forward and rearward facing and radially extending retention portions;
a terminal sleeve element mounting portion in said first passageway defining forward and rearward facing portions engaging said rearward and forward facing retention portions, respectively, to mount said end of said fiber optic light guide at a first predetermined distance from said first stop; and a transmission element, including an end portion capable of supporting light transmission, disposed in said second passageway;

transmission element mounting means in said second passageway mounting said transmission element with said optical end portion at a second predetermined distance from said second stop, said first and second predetermined distances selected to provide intimate association of said end of said fiber optic light guide and said optical end portion of said transmission element when said housings are mated with said first and second stops engaged.

21. The optical connector defined in claim 20, wherein said terminal sleeve mounting portion is a reduced diameter portion in said first passageway which defines said forward and rearward facing surfaces, and said terminal sleeve element comprises a sheet metal structure including forward and rearward retention tines which respectively carry said rearward and forward facing portions.

22. An optoelectronic connector unit comprising:

a housing including a passageway therethrough, said passageway including a reduced diameter portion defining forward and rearward facing surfaces; and a terminal sleeve element including a forward end and a rear end and adapted to encircle and be secured to a terminal portion of a fiber optic light guide so that at least the terminal end of said terminal portion extends forward to at least said forward end of said terminal sleeve element, said terminal sleeve element including rearward facing retention tines engaging said forward facing surface of said reduced diameter portion of said passageway and forward facing retention tines engaging said rearward facing surface of said reduced diameter portion of said passageway.

23. The connector set forth in claim 22, wherein said passageway includes a rear portion having an inner surface and said terminal sleeve element further comprises a resilient collar rearwardly of said forward facing retention tines and having a larger transverse dimension than said cavity for a press fit against said inner surface of said cavity, said resilient collar providing stabilization and axial alignment of said terminal sleeve element in said passageway.

24. The connector defined in claim 22, wherein said terminal sleeve element further comprises at least one crimpable section at said rear end thereof for securing a fiber optic light guide therein.

* * * * *